(12) United States Patent
Sun et al.

(10) Patent No.: US 7,283,321 B1
(45) Date of Patent: Oct. 16, 2007

(54) DISK DRIVES AND METHODS ALLOWING FOR DUAL STAGE ACTUATOR ADAPTIVE SEEK CONTROL AND MICROACTUATOR GAIN CALIBRATION

(75) Inventors: Yu Sun, Fremont, CA (US); Yunfeng Li, San Jose, CA (US); Lin Guo, Saratoga, CA (US); Paul Yeagle, Berthoud, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/197,572

(22) Filed: Aug. 4, 2005

Related U.S. Application Data (60) Provisional application No. 60/617,389, filed on Oct. 8, 2004.

(51) Int. Cl.
*G11B 5/596* (2006.01)
(52) U.S. Cl. .............................. 360/78.05; 360/78.12; 360/78.09
(58) Field of Classification Search ...................... None
See application file for complete search history.

(56) References Cited

U.S. PATENT DOCUMENTS

| 6,504,670 B1 | 1/2003 | Dittmar | |
|---|---|---|---|
| 2002/0176201 A1* | 11/2002 | Hsin et al. | 360/78.05 |
| 2004/0228027 A1* | 11/2004 | Zhang et al. | 360/78.05 |

OTHER PUBLICATIONS

Masahito Kobayashi and Roberto Horowitz "Track Seek Control for Hard Disk Dual-Stage Servo Systems", vol. 37, No. 2, Mar. 2001, pp. 949-954.
Y. Mizoshita, S. Hasegawa, and K. Takaishi "Vibration Minimized Access Control for Disk Drives", vol. 32, No. 3 May 1996, pp. 1793-1798.
Neil C. Singer, Lucy Y. Pao, William E. Singhose and Warren P. Seering "An Efficient Algorithm For The Generation of Multiple-Mode Input Shaping Sequences", Proceedings of the 1996 IEEE International Conference on Control Applications, Dearborn, MI; Sep. 15-18, 1996, pp. 373-378.
Masayoshi Tomizuka "Zero Phase Error Tracking Algorithm for Digital Control", Journal of Dynamic Systems, Measurement, and Control, Mar. 1987, vol. 109/65-109/68.

* cited by examiner

*Primary Examiner*—Andrew L. Sniezek
(74) *Attorney, Agent, or Firm*—Foley & Lardner LLP (57) ABSTRACT

A disk drive includes a disk, a head, a coarse actuator, a microactuator, and a servo controller. The microactuator positions the head relative to the disk. The coarse actuator positions the microactuator and the head relative to the disk. The servo controller controls the microactuator in accordance with a microactuator feedforward control signal that is provided by the servo controller based on a plurality of microactuator feedforward values. The servo controller tunes at least one microactuator feedforward value of the plurality of microactuator feedforward values. The servo controller scales the microactuator feedforward control signal in accordance with a microactuator feedforward gain, and the servo controller adjusts the microactuator feedforward gain based on a position error signal that is determined during a seek operation.

45 Claims, 4 Drawing Sheets

DISK DRIVES AND METHODS ALLOWING FOR DUAL STAGE ACTUATOR ADAPTIVE SEEK CONTROL AND MICROACTUATOR GAIN CALIBRATION

CROSS-REFERENCE TO RELATED PATENT APPLICATIONS

Embodiments of the present invention relate to U.S. Provisional Application Ser. No. 60/617,389, filed Oct. 8, 2004, entitled "Algorithm for Dual Stage Actuator Adaptive Seek Control and Microactuator Gain Calibration", the contents of which are incorporated by reference herein and which is a basis for a claim of priority.

BACKGROUND OF THE INVENTION

1. Field of the Invention

Embodiments of the present invention relate generally to disk drives and methods and, in specific embodiments, to a disk drive including a coarse actuator, a microactuator, and a servo controller, in which the servo controller is configured to tune microactuator feedforward values that are stored in a microactuator feedforward look-up table and to adjust a microactuator feedforward gain by which a microactuator feedforward control signal is scaled.

2. Related Art

Disk drives are widely used in computers and other electronic devices for the storage and retrieval of data. Disk drive manufacturers are constantly working to try to increase the performance of disk drives by increasing a data transfer rate of the disk drives. One main way to increase the data transfer rate of disk drives is to lower a seek time, which is a time required to position a head for a read or a write operation. Thus, disk drive manufacturers are very interested in new ways of reducing seek time.

In general, related art disk drives comprise one or more disks for storing data, a coarse actuator, a microactuator, an actuator arm assembly, one or more transducers or heads, and a servo controller. Each head is operable to read data from and to write data to concentric circular tracks on a surface of a corresponding disk. The actuator arm assembly includes a first member connected to a base of the disk drive and a second member on which the heads are mounted. The microactuator interconnects the first member and the second member of the actuator arm assembly to provide for fine positioning of the heads. The coarse actuator controls the actuator arm assembly to move the microactuator relative to the disk and, as a consequence, provides coarse positioning of the heads.

Servo controllers of disk drives typically perform the functions of seek control and track following. To perform seek control, servo controllers generally provide for a single-stage seek trajectory in which the servo controller controls the coarse actuator to move the actuator arm assembly and, as a result, position a head over a desired track of the disk for a read or a write operation. Such a servo controller may be configured to control the movement of the coarse actuator based on a coarse actuator control loop.

As part of the coarse actuator control loop, the servo controller determines a position error signal during the positioning of the head by reading servo data stored in servo sectors on the disk. The servo controller then controls the movement of the coarse actuator based on the position error signal. Some servo controllers allow for feedforward control signals to be applied to the coarse actuator control loop in order to further control the movement of the coarse actuator. The feedforward control signals for the coarse actuator control loop may be based on feedforward control values that are stored in a look-up table.

In the past, the microactuator has generally not been used for seek operations. Instead, the microactuator has typically been used for track following. Servo controllers generally perform track following once a head has been positioned over a desired track after a seek operation. Such servo controllers may control the microactuator to finely position the head with respect to the desired track based on a position error signal, so that an accuracy of track following can be increased. The range of movement of the microactuator is generally much less than the range of movement of the coarse actuator, and microactuators typically have a maximum range of movement of about a few tracks in either direction. In contrast, most coarse actuators have a range of movement that allows for movement of a head across all tracks on a disk.

However, the microactuator of related art disk drives generally provides for much faster positioning of the head than is provided for by the coarse actuator. Such a difference in positioning speed is realized because the microactuator typically comprises a piezoelectric actuator, an electromagnetic actuator, an electrostatic actuator, or the like, that moves immediately when a current is applied, whereas the coarse actuator is typically a voice coil motor (VCM) that does not move the actuator arm assembly immediately when a current is applied due to some inertia.

Recently, there has been an effort to take advantage of the rapid movement of the microactuator to reduce seek time during short seeks that seek the head over a small number of tracks. Instead of only using the coarse actuator to perform a seek operation, it has been proposed to use both the coarse actuator and the microactuator during seek operations by having a dual stage seek trajectory, including both a stepping stage and a retracting stage. Such a dual stage seek trajectory takes advantage of the ability of the microactuator to move the head rapidly within a certain range that can cover a small number of tracks.

During the stepping stage of a dual stage seek trajectory, the microactuator moves the head to a target track on the disk very quickly. Then, once the head is over the target track, the retracting stage begins in which the microactuator moves in the opposite direction of the coarse actuator so as to keep the head over the target track while the coarse actuator moves the microactuator toward the target track. In the best case, the head may be declared on-track at the end of the stepping stage when the head reaches the target track, while both the coarse actuator and the microactuator are still moving.

The microactuator must be controlled very precisely to reduce post seek track-misregistration (TMR) when a dual stage seek trajectory is employed. In order to control the microactuator, some related art disk drives have a microactuator control loop, which allows for a movement of the microactuator to be controlled in accordance with a control signal that is based on microactuator feedforward values. The microactuator feedforward values are typically precomputed and stored with the assumption that the microactuator has a linear gain. Ideally, the microactuator moves the head to the target track exactly at the end of the stepping stage and tracks the coarse actuator trajectory perfectly in the opposite direction during the retracting stage.

However, in reality, the microactuator usually does not have a perfectly linear gain, so the microactuator will not move as precisely as expected based on the control signal. Some microactuators are known to have hysteresis and nonlinearity characteristics, and their gains are known to be sensitive to temperature change. Testing shows that some microactuators have up to 20% nonlinearity in gain from small to full scale excitation, and up to 20% change in gain for a change in temperature from 0° C. to 65° C. In addition, seek TMR may also be affected by a reference track error of a coarse actuator control loop due to modeling error, and may be affected by pivot friction of the coarse actuator.

In the related art disk drives that provide feedforward control for microactuator control loops based on microactuator feedforward values that are stored in a microactuator feedforward look-up table, the microactuator feedforward values in the look-up table are typically precomputed based on a model in which a gain of the microactuator is treated as a linear gain. Also, in the related art disk drives, the microactuator feedforward values are typically precomputed and stored once, usually during the design process, and then remain stored as constant values. Since the microactuator feedforward values in the related art disk drives are precomputed with the assumption that the microactuator has a linear gain and then are stored as constant values, there is no way in the prior art disk drives to tune the microactuator feedforward values during operation of the disk drives to account for a nonlinearity of a gain of the microactuator.

Furthermore, in the prior art disk drives, a microactuator feedforward control signal is provided based on the microactuator feedforward values stored in the feedforward look-up table, and the microactuator feedforward control signal is scaled in accordance with a microactuator feedforward gain that is set and then remains constant during disk drive operation. Since the microactuator feedforward gain remains constant during disk drive operation in the related art disk drives, there is no way to adjust the microactuator feedforward gain to compensate for a change in a gain of the microactuator due to a change in temperature. Thus, the control of the microactuator will not be as precise as expected when the gain of the microactuator changes from an assumed gain that is used to set the microactuator feedforward gain to a different gain due to a change in temperature.

Thus, in the related art disk drives, there is still an undesirable amount of seek TMR associated with dual stage seek operations that inhibits on-track from being declared sooner. As a result, seek time is increased due to the undesirable seek TMR and the data transfer rate of the disk drives is reduced.

In light of the above-mentioned problems, there is a need for disk drives and methods that allow for improved control of microactuators during short seek operations with dual stage seek trajectories, so as to compensate for position errors due to modeling errors, pivot friction, nonlinearity of microactuator gains, changes in microactuator gains due to changes in temperature, and the like. Accordingly, there is a need for disk drives and methods that can provide for adaptive seek control by allowing for microactuator feedforward values to be tuned, and that can provide for microactuator gain calibration by allowing for a microactuator feedforward gain to be adjusted in real time.

SUMMARY OF THE DISCLOSURE

Embodiments of the present invention relate to disk drives and methods that allow for dual stage actuator adaptive seek control and microactuator gain calibration. Some embodiments allow for initial microactuator feedforward values that are stored in a microactuator feedforward look-up table to be self-tuned through an iterative learning algorithm. Various embodiments allow for a microactuator feedforward gain to be adaptively adjusted in real-time. Further embodiments allow for real-time gain calibration of a microactuator feedforward gain during both short seek and long seek operations in accordance with a gain adaptation process.

Such disk drives and methods may provide for improved control of coarse actuators and microactuators during seek operations by compensating for position errors due to modeling errors, pivot friction, nonlinearity of microactuator gains, changes in microactuator gains due to changes in temperature, and the like. Hence, embodiments of the present invention may provide for improved microactuator control to reduce seek track-misregistration (TMR) and, as a result, may allow for declaring on-track sooner, reducing a seek time, and improving the performance of disk drives by increasing a data transfer rate of the disk drives.

A disk drive according to an embodiment of the present invention includes a disk, a head, a coarse actuator, a microactuator, and a servo controller. A surface of the disk has a plurality of tracks for storing data. The head is operable to read data from the disk. The microactuator allows for positioning the head relative to the disk, and the coarse actuator allows for positioning the microactuator relative to the disk. The servo controller is configured to control the microactuator based on a plurality of microactuator feedforward values, and is configured to tune at least one microactuator feedforward value of the plurality of microactuator feedforward values.

The coarse actuator may be configured to coarsely position the head, and may comprise a motor, such as a voice coil motor (VCM), and the like. The microactuator may be configured to finely position the head, and may comprise a piezoelectric actuator, an electromagnetic actuator, an electrostatic actuator, and the like. The coarse actuator may have a range of movement that is much larger than a range of movement of the micro actuator.

In various embodiments, the servo controller is configured to provide dual-loop feedforward control in which the coarse actuator is controlled in accordance with a coarse actuator control loop and the microactuator is controlled in accordance with a microactuator control loop. The servo controller may be configured to provide feedforward control to the coarse actuator control loop based on a plurality of coarse actuator feedforward values, and to provide feedforward control to the microactuator control loop based on a plurality of microactuator feedforward values.

The servo controller may be configured to generate initial values for the plurality of microactuator feedforward values based on a model in which a gain of the microactuator is modeled as a linear gain. In various embodiments, the microactuator feedforward values are stored in a look-up table in a memory, and the servo controller is configured to tune at least one microactuator feedforward value so as to update a stored value of the at least one microactuator feedforward value.

In some embodiments, the servo controller is configured to control both the coarse actuator and the microactuator to perform a seek operation to position the head over a target track on the disk, and to determine a position error signal during the seek operation. In further embodiments, the servo controller is configured to tune at least one microactuator feedforward value based on the determined position error signal. In still further embodiments, the servo controller is configured to tune at least one microactuator feedforward value based on the determined position error signal such that a seek TMR of a subsequent seek operation is less than a seek TMR of the performed seek operation.

In yet further embodiments, the servo controller is configured to control the coarse actuator and the microactuator to perform a seek operation and to tune at least one microactuator feedforward value when the disk drive is powered-on. In still further embodiments, the servo controller is configured to control the coarse actuator and the microactuator to perform a seek operation and to tune at least one microactuator feedforward value when the disk drive performs a self-test.

In various embodiments, the servo controller is configured to control the coarse actuator and the microactuator to perform seek operations, and to determine a position error signal during each of the seek operations. In further embodiments, the servo controller is configured to tune at least one microactuator feedforward value in accordance with an iterative algorithm based on the position error signal.

In some embodiments, the servo controller is configured to tune at least one microactuator feedforward value so as to compensate for position error due to at least one of a nonlinearity of a gain of the microactuator, a change in a gain of the microactuator due to a change in temperature, a modeling error in a model used to generate initial values for the plurality of microactuator feedforward values, pivot friction generated when the coarse actuator pivots an actuator arm assembly on which the head is mounted, and the like.

In various embodiments, the servo controller is configured to control the coarse actuator based on a plurality of coarse actuator feedforward values and to control the microactuator based on a plurality of microactuator feedforward values to perform a short seek operation with a dual-stage seek trajectory, including a stepping stage and a retracting stage, to position the head over a target track. In further embodiments, the servo controller is configured to control the microactuator during the stepping stage such that the microactuator moves the head toward the target track, and is configured to control the coarse actuator and the microactuator during the retracting stage such that the coarse actuator moves the microactuator toward the target track while the microactuator moves the head so as to maintain the head over the target track.

A disk drive in accordance with various embodiments of the present invention includes a disk, a head, a coarse actuator, a microactuator, and a servo controller. The servo controller performs a seek operation by controlling the coarse actuator and the microactuator, and determines a position error signal during the seek operation. The servo controller is configured to scale a microactuator feedforward control signal in accordance with a microactuator feedforward gain, and to control the microactuator based on the scaled microactuator feedforward control signal. The servo controller is configured to adjust the microactuator feedforward gain based on the determined position error signal.

In some embodiments, the servo controller provides the microactuator feedforward control signal in accordance with a plurality of microactuator feedforward control values. In various embodiments, the servo controller is configured to adjust the microactuator feedforward gain to compensate for position error caused by a change in a gain of the microactuator due to a change in temperature. In some embodiments, the servo controller is configured to perform multiple seek operations, and to determine the position error signal during each of the multiple seek operations. In various embodiments, the servo controller is configured to adjust the microactuator feedforward gain in accordance with an iterative algorithm based on a determined position error signal.

In some embodiments, the servo controller is configured to perform a seek operation as a long seek operation in which the servo controller controls the coarse actuator to move the microactuator and the head toward a target track. In further embodiments, the servo controller is configured to control, at the beginning of the long seek operation before the coarse actuator moves, the microactuator to move the head based on a microactuator feedforward control signal, and to determine a position error signal when the microactuator moves the head. In yet further embodiments, the servo controller is configured to adjust a microactuator feedforward gain based on the determined position error signal.

A method according to an embodiment of the present invention allows for controlling a microactuator based on a plurality of microactuator feedforward values and for tuning at least one microactuator feedforward value of the plurality of microactuator feedforward values. A method according to various embodiments of the present invention allows for scaling a microactuator feedforward control signal in accordance with a microactuator feedforward gain, for controlling the microactuator based on the scaled microactuator feedforward control signal during a seek operation, for determining a position error signal during the seek operation, and for adjusting the microactuator feedforward gain based on the determined position error signal.

Therefore, embodiments of the present invention may enhance the performance of disk drives by allowing for adaptive seek control and gain calibration. The adaptive seek control may be provided by, for example, tuning microactuator feedforward values. The gain calibration may be provided by, for example, adjusting a microactuator feedforward gain. Such adaptive seek control and gain calibration may improve the control of movements of a microactuator during seek operations and, as a consequence, may reduce seek TMR, allow for declaring on-track sooner, reduce seek time, and improve the performance of disk drives by increasing a data transfer rate of the disk drives.

DETAILED DESCRIPTION OF PREFERRED EMBODIMENTS

Figure 1:
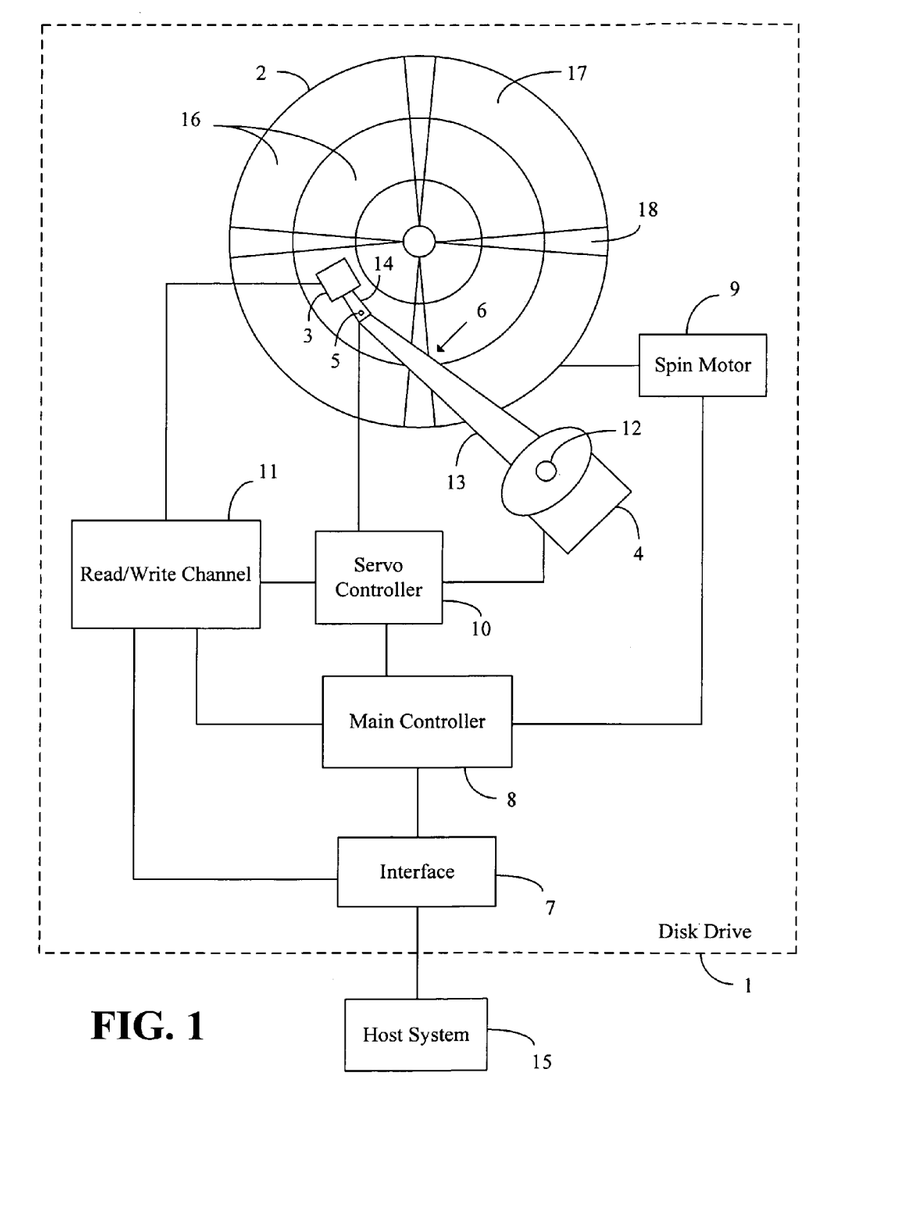
FIG. 1 illustrates a functional block diagram of a disk drive of an embodiment of the present invention.

FIG. 1 illustrates a functional block diagram of a disk drive 1 of an embodiment of the present invention. The disk drive 1 comprises a disk 2, a transducer or head 3, a coarse actuator 4, a microactuator 5, an actuator arm assembly 6, an interface 7, a main controller 8, a spin motor 9, a servo controller 10, and a read/write (r/w) channel 11. The head 3 is mounted on one end of the actuator arm assembly 6, and another end of the actuator arm assembly 6 is connected to a base (not shown) of the disk drive 1 by a bearing 12.

The actuator arm assembly 6 comprises a first member 13 and a second member 14 that are interconnected by the microactuator 5. During operation, the disk 2 spins around a central axis, and the head 3 reads data from or writes data to a surface of the disk 2. The coarse actuator 4 rotates the actuator arm assembly 6 about the bearing 12 in order to control a position of the microactuator 5 and the head 3 over the disk 2. The microactuator 5 moves the second member 14 of the actuator arm assembly 6 to position the head 3 over the disk 2.

The coarse actuator 4 may comprise a motor, such as a voice coil motor (VCM) and the like, and may provide for coarse positioning of the head 3 over the disk 2. The microactuator 5 may comprise, for example, a piezoelectric actuator, an electromagnetic actuator, an electrostatic actuator, and the like. The microactuator 5 may provide for fine positioning of the head 3 over the disk 2. A range of movement of the microactuator 5 may be small, such as moving the head 3 across a few tracks, while a range of movement of the coarse actuator 4 may be large, such as moving the head 3 across all tracks on the disk 2.

The disk drive 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element.

In the following discussion, the disk drive 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to a host system 15, the interface 7 communicates with the host system 15 to receive, for example, data and commands, and to send, for example, data and status identifiers. The interface 7 also communicates with the main controller 8 and the r/w channel 11 to send and receive, for example, data and commands. When the main controller 8 receives a command from the interface 7 for a read or a write operation, the main controller 8 provides a signal to the spin motor 9 to cause the disk 2 to spin.

As shown in FIG. 1, the disk 2 has a plurality of tracks 16 for storing data. Each of the tracks 16 has a plurality of data sectors 17 and a plurality of embedded servo sectors 18. During operation of the disk drive 1, a data block may be read from or written to a data sector of the plurality of data sectors 17. The plurality of embedded servo sectors 18 are written with servo patterns or data that are used for determining a position of the head 3 with respect to a track of the plurality of tracks 16.

When performing a read or a write operation, the main controller 8 sends a signal that contains information about a selected track to the servo controller 10. The servo controller 10 then performs a seek operation to position the head 3 over the selected track. The seek operation may be a short seek operation, in which the head 3 is moved across a number of tracks that are within the range of movement of the microactuator 5, or a long seek operation, in which the head 3 is moved across a number of tracks that is outside of the range of movement of the microactuator 5. Ideally, the head 3 is positioned directly over a center of the selected track during the seek operation.

However, in reality, when the head 3 is positioned over the selected track, there will be some amount of seek settle track-misregistration (TMR), which represents a misalignment of the head 3 from the center of the selected track during seek settle when the head 3 is settling over the selected track. The seek settle TMR may be due to, for example, the head 3 overshooting the center of the selected track and having to be repositioned toward the center of the selected track. The head 3 may have particular tolerances to perform operations even when there is some TMR, so the servo controller 10 may wait for the head 3 to settle over the selected track, and may declare that the head 3 is on-track once the TMR is within a tolerance of the head 3 for an operation.

When the servo controller 10 determines that the head 3 is on-track, the servo controller 10 sends a signal to the r/w channel 11 to allow for the start of a read or a write operation. It is also possible that the servo controller 10 sends the signal to the main controller 8 rather than to the r/w channel 11, in which case the main controller 8 would then send the signal to the r/w channel 11. The r/w channel 11 also receives a command from the main controller 8 that specifies the type of operation to be performed. In the case of a read operation, the r/w channel 11 causes the head 3 to read the data and then sends the data to either the interface 7 or the main controller 8. In the case of a write operation, the r/w channel 11 receives data from either the interface 7 or the main controller 8 and causes the head 3 to write the data.

The performance of short seek operations by the disk drive 1 will now be discussed. The servo controller 10 may be configured to determine whether a seek operation can be performed as a short seek operation with a dual stage trajectory by determining whether a seek distance from a current track at which the head 3 is positioned to a target track of a seek operation is within a range of movement (i.e. within a stroke limit) of the microactuator 5. The servo controller 10 may be configured to perform a short seek operation with a dual stage seek trajectory in the case that the servo controller 10 determines that the seek distance is within the range of movement of the microactuator 5. The main controller 8 may be configured to determine the seek distance rather than the servo controller 10, in which case the main controller 8 may be configured to instruct the servo controller 10 to perform the short seek operation with a dual stage seek trajectory if the seek distance is within the range of movement of the microactuator 5.

The servo controller 10 may be configured to perform a short seek operation with a dual stage seek trajectory in order to reduce seek time. A dual stage seek trajectory is designed to have two stages, a stepping stage and a retracting stage, according to the moving direction of the microactuator 5. During the stepping stage, the servo controller 10 may control the microactuator 5 to move the head 3 to the target track as quickly as possible. Once the head 3 reaches the target track, the servo controller 10 may begin the retracting stage in which the servo controller 10 may control the microactuator 5 to move in the opposite direction of the coarse actuator 4 to keep the head 3 over the target track while the servo controller 10 controls the coarse actuator 4 to move the microactuator 5 toward the target track. In the best case, the servo controller 10 declares that the head 3 is on-track at the end of the stepping stage when the head 3 reaches the target track, while both the coarse actuator 4 and the microactuator 5 are still moving.

Figure 2:
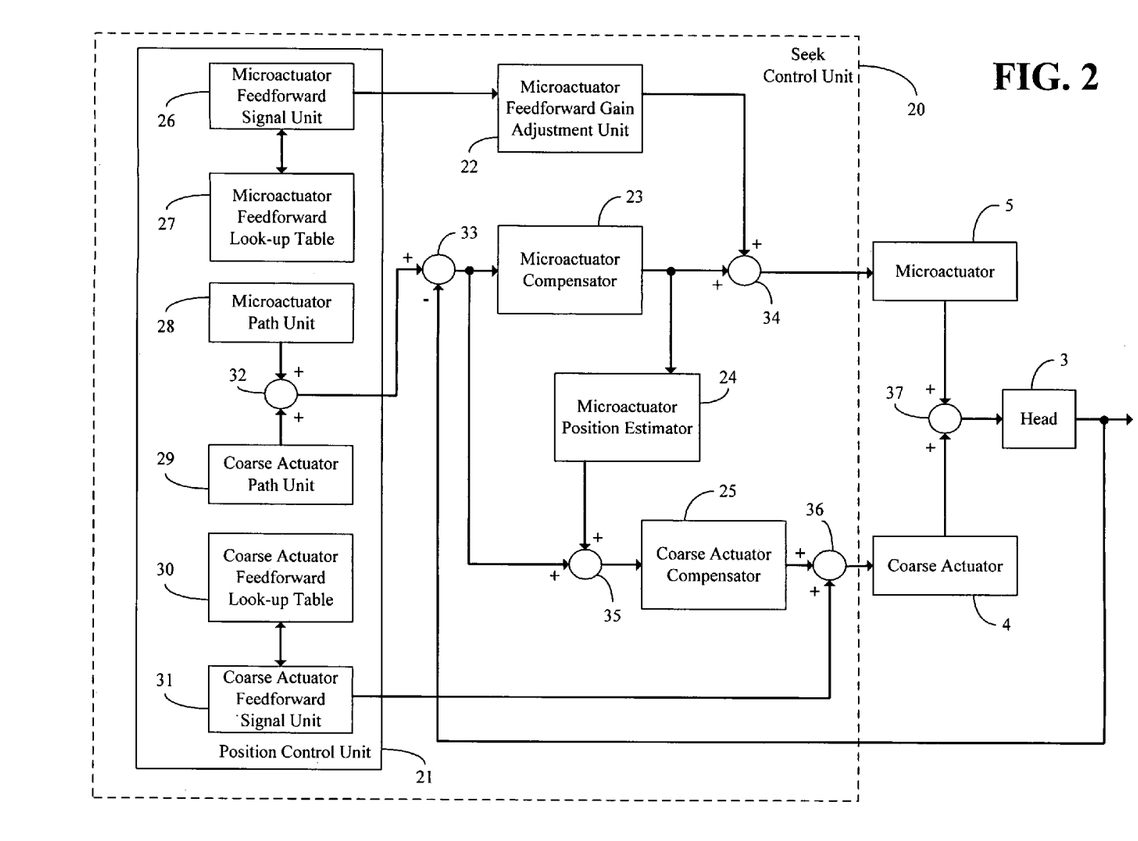
FIG. 2 illustrates a block diagram of a seek control unit of a servo controller in communication with a microactuator and a coarse actuator that are in communication with a head in accordance with an embodiment of the present invention.

When performing a short seek operation with a dual stage seek trajectory, the microactuator 5 must be controlled very precisely to reduce post seek TMR. An embodiment of a dual feedforward short seek control scheme allowing for a dual stage seek trajectory will now be discussed. FIG. 2 shows a block diagram of a seek control unit 20 of the servo controller 10 in accordance with an embodiment of the present invention for controlling the coarse actuator 4 and the microactuator 5.

The seek control unit 20 is part of the servo controller 10. In the following discussion, the seek control unit 20 is described with reference to functional blocks and not discrete hardware elements. The functions may be implemented using one or more of hardware, software, and firmware. More than one function, or different parts of functions, may be combined in a given hardware, software, or firmware implementation.

The seek control unit 20 comprises a position control unit 21, a microactuator feedforward gain adjustment unit 22, a microactuator compensator 23, a microactuator position estimator 24, and a coarse actuator compensator 25. The position control unit 21 comprises a microactuator feedforward signal unit 26, a microactuator feedforward look-up table 27, a microactuator path unit 28, a coarse actuator path unit 29, a coarse actuator feedforward look-up table 30, and a coarse actuator feedforward signal unit 31.

The microactuator path unit 28 is configured to provide a microactuator reference trajectory signal that specifies a reference trajectory for the microactuator 5. The reference trajectory for the microactuator 5 is a desired trajectory that the microactuator 5 should ideally follow to move the head 3 during a particular seek operation. Such a microactuator reference trajectory may specify target positions at which the head 3 should be positioned by the microactuator 5 with respect to a certain track at specified times during the particular seek operation. The microactuator reference trajectory may be specified, for example, by a function or by reference values stored in a table.

The coarse actuator path unit 29 is configured to provide a coarse actuator reference trajectory signal that specifies a reference trajectory for the coarse actuator 4. The reference trajectory for the coarse actuator 4 is a desired trajectory that the coarse actuator 4 should ideally follow to move the head 3 during the particular seek operation. Such a coarse actuator reference trajectory may specify target positions at which the head 3 should be positioned by the coarse actuator 4 with respect to the certain track at specified times during the particular seek operation. The coarse actuator reference trajectory may be specified, for example, by a function or by reference values stored in a table.

The microactuator reference trajectory signal provided by the microactuator path unit 28 may be added to the coarse actuator reference trajectory signal provided by the coarse actuator path unit 29 by the first summing node 32 to produce a single reference trajectory signal. The seek control unit 20 may be configured to control both the coarse actuator 4 and the microactuator 5 based on the single reference trajectory signal provided by the first summing node 32.

By controlling both the coarse actuator 4 and the microactuator 5 based on a single reference trajectory signal, the control of the seek operation can be simplified as compared to related art systems in which the coarse actuator reference trajectory signal and the microactuator reference trajectory signal are separately used to control the coarse actuator and the microactuator respectively. Of course, embodiments of the present invention are not limited to having a single reference trajectory signal, and some embodiments may allow for controlling the coarse actuator 4 and the microactuator 5 based on separate reference trajectory signals.

The microactuator feedforward signal unit 26 is configured to obtain a microactuator feedforward value from the microactuator feedforward look-up table 27, and to provide a microactuator feedforward control signal based on the obtained microactuator feedforward value. The microactuator feedforward signal unit 26 is configured, for example, to obtain each of the microactuator feedforward values in order from the microactuator feedforward look-up table 27 at specified time intervals during short seek operations, and to provide the microactuator feedforward control signal based on each obtained microactuator feedforward value.

The microactuator feedforward look-up table 27 may comprise a memory that stores microactuator feedforward values in an order. Initial values for the microactuator feedforward values in the microactuator feedforward look-up table 27 may be precomputed and stored during a design process of the disk drive 1. The initial values may be precomputed based on a model in which a gain of the coarse actuator 4 and a gain of the microactuator 5 are assumed to be linear.

The coarse actuator feedforward signal unit 31 is configured to obtain a coarse actuator feedforward value from the coarse actuator feedforward look-up table 30, and to provide a coarse actuator feedforward control signal based on the obtained coarse actuator feedforward value. The coarse actuator feedforward signal unit 31 is configured, for example, to obtain each of the coarse actuator feedforward values in order from the coarse actuator feedforward look-up table 30 at specified time intervals during short seek operations, and to provide the coarse actuator feedforward control signal based on each obtained coarse actuator feedforward value.

The coarse actuator feedforward look-up table 30 may comprise a memory that stores coarse actuator feedforward values. Initial values for the coarse actuator feedforward values in the coarse actuator feedforward look-up table 30 may be precomputed and stored during a design process of the disk drive 1. The initial values may be precomputed based on a model in which a gain of the coarse actuator 4 and a gain of the microactuator 5 are assumed to be linear.

During a seek operation, the head 3 reads data from servo sectors of the plurality of servo sectors 18 on the disk 2, and the head 3 provides a signal based on the read data to the r/w channel 11. The r/w channel 11 processes the signal from the head 3 when the head 3 reads data from the servo sectors, and the r/w channel 11 provides servo information to the servo controller 10 by processing the signal from the head 3. The servo controller 10 uses the servo information as a sensed position signal that indicates a position of the head 3 with respect to a track of the plurality of tracks 16. In the seek control unit 20 of the servo controller 10, the sensed position signal is used as feedback. A second summing node 33 is configured to subtract the sensed position signal from the reference signal that is provided by the first summing node 32 in order to provide a position error signal (PES). Thus, the position error signal indicates a difference between a desired reference position of the head 3 specified by the reference signal and an actual position of the head 3 specified by the sensed position signal.

The microactuator compensator 23 receives the position error signal that is provided by the second summing node 33. The microactuator compensator 23 is configured to provide a microactuator compensation signal based on the position error signal that can be used to control the microactuator 5 to compensate for the position error. The microactuator position estimator 24 receives the microactuator compensation signal that is provided by the microactuator compensator 23. The microactuator position estimator 24 is configured to estimate a response of the microactuator 5 to the microactuator compensation signal, and the microactuator position estimator 24 provides an estimated microactuator position signal that estimates a movement of the head 3 by the microactuator 5 in response to the microactuator compensation signal. The position error signal and the estimated microactuator position signal are added by a third summing node 35 to provide an adjusted position error signal that takes into account an estimate of a response of the microactuator 5 to the position error signal.

The coarse actuator compensator 25 receives the adjusted position error signal that is provided by the third summing node 35. The coarse actuator compensator 25 is configured to provide a coarse actuator compensation signal based on the adjusted position error signal that can be used to control the coarse actuator 4 to compensate for the position error and for the movement of the microactuator 5 in response to the position error. Thus, the response of the coarse actuator compensator 25 takes into account an estimate of the response of the microactuator 5 to the position error signal.

The microactuator feedforward gain adjustment unit 22 receives the microactuator feedforward control signal that is provided by the microactuator feedforward signal unit 26. The microactuator feedforward gain adjustment unit 22 is configured to scale the microactuator feedforward control signal in accordance with a microactuator feedforward gain, and to provide a scaled microactuator feedforward control signal. The microactuator feedforward gain may be variable, and may be adjusted during operation of the disk drive 1.

The scaled microactuator feedforward control signal provided by the microactuator feedforward gain adjustment unit 22 and the microactuator compensation signal provided by the microactuator compensator 23 are added by a fourth summing node 34 to provide a microactuator control signal. The microactuator 5 is configured to move the head 3 in accordance with the microactuator control signal. The coarse actuator feedforward control signal provided by the coarse actuator feedforward signal unit 31 and the coarse actuator compensation signal provided by the coarse actuator compensator 25 are added by a fifth summing node 36 to provide a coarse actuator control signal. The coarse actuator 4 is configured to move the head 3 in accordance with the coarse actuator control signal. The sixth summing node 37 illustrates that the movement of the head 3 is a combination of the movement of the head 3 due to the output of the microactuator 5 and the movement of the head 3 due to the output of the coarse actuator 4.

Embodiments of the present invention allow for improving a control of the microactuator 5 based on two techniques: (i) tuning the microactuator feedforward values that are stored in the microactuator feedforward look-up table 27; and (ii) adjusting the microactuator feedforward gain by which the microactuator feedforward gain adjustment unit 22 scales the microactuator feedforward control signal. Some embodiments may use only one of the techniques, while other embodiments may use both techniques together to improve the control of the microactuator 5. The technique of tuning the microactuator feedforward values will first be discussed, and then the technique of adjusting the microactuator feedforward gain will be discussed later.

Initial values for the microactuator feedforward values in the microactuator feedforward look-up table 27 may be set, for example, during a design process by precomputing values in accordance with a model in which a gain of the microactuator 5 is assumed to be linear. However, in reality, the gain of the microactuator 5 may not be perfectly linear, but may have some nonlinearity and hysteresis characteristics. For example, due to physical properties of the microactuator 5, the microactuator 5 may have a larger gain as an input to the microactuator 5 increases. Also, there may be some unmodeled dynamics of the disk drive 1 such as a pivot friction of the coarse actuator 4 that can vary among disk drives. Thus, the initial microactuator feedforward values in the microactuator feedforward look-up table 27 that are precomputed based on a simplified model may not provide as precise of control of the microactuator 5 as expected due to sources of error such as those mentioned above that may repeat for each seek operation.

Figure 3:
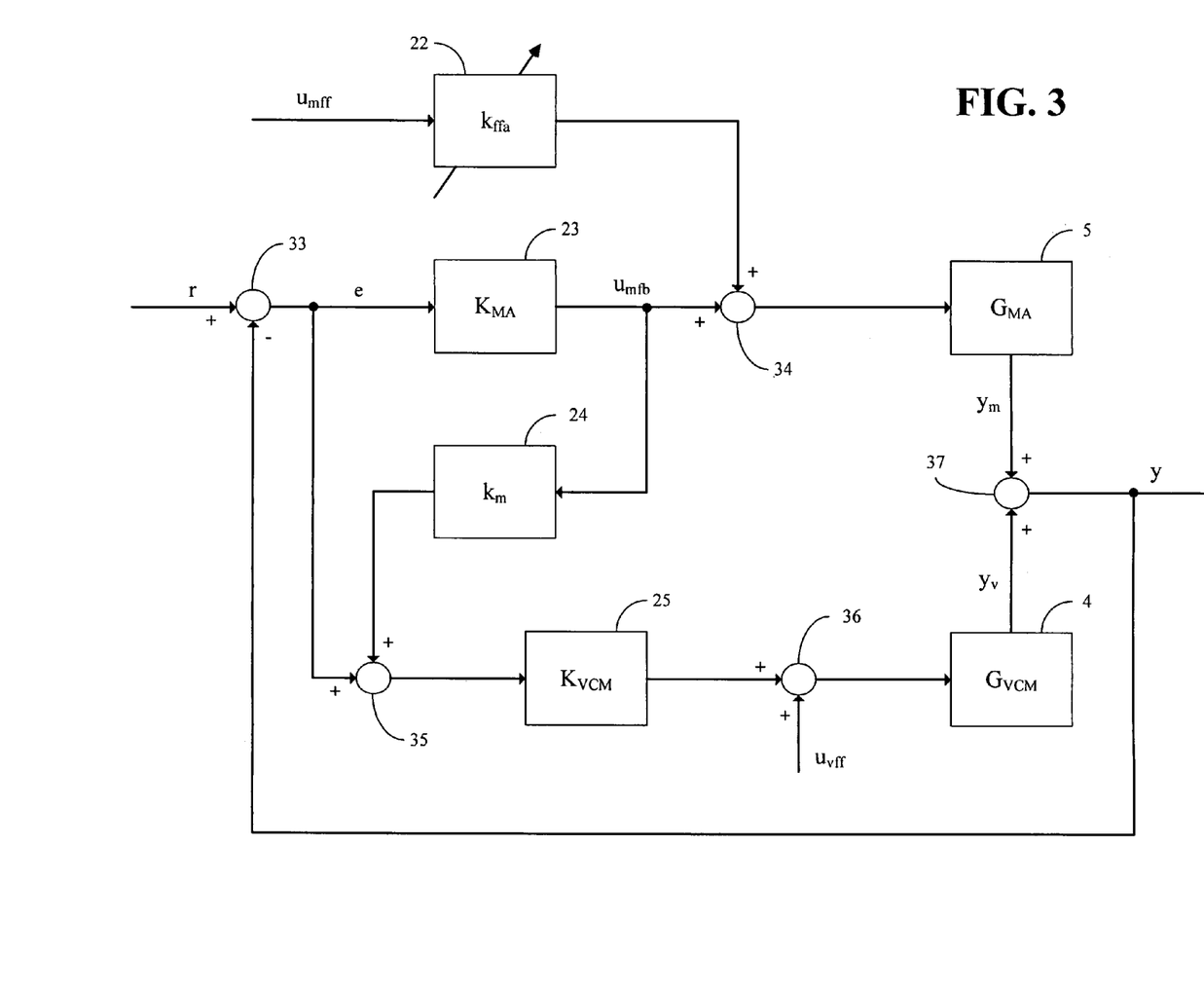
FIG. 3 illustrates a block diagram of a model of a dual stage actuator seek control design in accordance with an embodiment of the present invention.

By tuning the microactuator feedforward values in the microactuator feedforward look-up table 27, there is an opportunity to improve the control of the movements of the microactuator 5 and, as a result, to reduce seek TMR. In order to aid in explaining an algorithm for tuning microactuator feedforward values, FIG. 3 illustrates a block diagram of a model of a dual stage actuator seek control design. The model of FIG. 3 is a model of the seek control unit 20, the coarse actuator 4, and the microactuator 5 of FIG. 2, and the model elements in FIG. 3 are model elements of the like numbered elements in FIG. 2.

In the model of FIG. 3, the coarse actuator 4 has a transfer function $G_{VCM}$, the coarse actuator compensator 25 has a transfer function $K_{VCM}$, the microactuator 5 has a transfer function $G_{MA}$, the microactuator compensator 23 has a transfer function $K_{MA}$, the microactuator position estimator 24 has a gain $k_m$, and the microactuator feedforward gain adjustment unit 22 has a variable gain $k_{ffa}$. Also, the reference trajectory signal input to the second summing node 33 is denoted as r, the position error signal provided by the second summing node 33 is denoted as e, the microactuator compensation signal provided by the microactuator compensator 23 is denoted as $u_{mfb}$, the microactuator feedforward control signal input to the microactuator feedforward gain adjustment unit 22 is denoted $u_{mff}$, the coarse actuator feedforward control signal input to the fifth summing node 36 is denoted as $u_{vff}$, the output of the microactuator 5 is denoted as $y_m$, the output of the coarse actuator 4 is denoted as $y_v$, and the sensed position signal of the head 3 that is input to the second summing node 33 is denoted as y.

By denoting the microactuator compensation signal as $u_{mfb}$, it is recognized that the microactuator compensation signal is a feedback signal for the microactuator 5. Also, by denoting the microactuator feedforward control signal as $u_{mff}$, it is recognized that the microactuator feedforward control signal is a feedforward signal for the microactuator 5. If the transfer function $G_{MA}$ of the microactuator 5 is assumed to be a linear gain $k_m$, and the variable gain $k_{ffa}$ of the microactuator feedforward gain adjustment unit 22 is assumed to be equal to 1, then the output $y_m$ of the microactuator 5 would be specified by the following equation:

$$y_m(j+1) = k_m(u_{mfb}(j) + u_{mff}(j)) \quad \text{(Equation 1)}$$

The value of the microactuator feedforward control signal $u_{mff}$ that is provided by the microactuator feedforward signal unit 26 based on the $j^{th}$ entry of microactuator feedforward values in the microactuator feedforward look-up table 27 is denoted as $u_{mff}(j)$. The value of the microactuator compensation signal $u_{mfb}$ that is provided by the microactuator compensator 23 at the time that the microactuator feedforward signal unit 26 is providing the microactuator feedforward control signal based on the $j^{th}$ entry in the microactuator feedforward look-up table 27, is denoted as $u_{mfb}(j)$. The microactuator feedforward look-up table 27 may have as many entries of microactuator feedforward values as needed to complete the control of the microactuator 5 during a short seek operation. The total number of entries in the microactuator feedforward look-up table 27 may be denoted as L. Each entry in the microactuator feedforward look-up table 27 may be obtained in order by the microactuator feedforward signal unit 26 during a short seek operation.

The servo controller 10 may be configured to tune the microactuator feedforward values that are stored in the microactuator feedforward look-up table 27. For example, the servo controller 10 may control the coarse actuator 4 and the microactuator 5 to perform a seek operation to position the head 3 over a target track, such as a short seek operation with a dual stage seek trajectory. Then, during the seek operation, the servo controller 10 may determine the position error signal e, and the servo controller 10 may be configured to tune the microactuator feedforward values based on the determined position error signal e.

In various embodiments, the servo controller 10 performs multiple seek operations and determines the position error signal during each of the seek operations. Then, the servo controller 10 may be configured to tune the microactuator feedforward values in the microactuator feedforward look-up table 27 in accordance with an iterative algorithm that has, for example, an iteration step for each seek operation. In various embodiments, the iterative algorithm for updating the microactuator feedforward values in the microactuator feedforward look-up table 27 may be specified by the following equation:

$$u_{mff}(n+1,j)=u_{mff}(n,j)+u_{mfb}(n,j)+\beta_{ff}*e(n,j+1), j=1,\ldots,L \quad \text{(Equation 2)}$$

In equation 2, n is an index of an iteration step in the iterative algorithm, and n may be incremented, for example, each time a seek operation is performed. Also, in equation 2, $\beta_{ff}$ specifies an adaptation gain, which is a parameter that can be set to a desired value. The value $u_{mff}(n,j)$ is the value of the microactuator feedforward control signal $u_{mff}$ that is provided by the microactuator feedforward signal unit 26 based on the $j^{th}$ entry of the microactuator feedforward look-up table 27 during the $n^{th}$ step of learning in the iterative algorithm. The value $u_{mfb}(n,j)$ is the value of the microactuator compensation signal $u_{mfb}$ that is provided by the microactuator compensator 23 at the time that the microactuator feedforward signal unit 26 is providing the microactuator feedforward control signal based on the $j^{th}$ entry of the microactuator feedforward look-up table 27 during the $n^{th}$ step of learning in the iterative algorithm.

Moreover, in equation 2, the value $e(n,j+1)$ is the value of the position error signal e that results once the microactuator 5 has been controlled to position the head 3 in accordance with the microactuator control signal provided by the fourth summing node 34 after the values $u_{mff}(n,j)$ and $u_{mfb}(n,j)$ have been input to the fourth summing node 34. Also, the value L is the total number of entries of microactuator feedforward values in the microactuator feedforward look-up table 27.

In equation 2, the value of the microactuator feedforward control signal $u_{mff}$ that is provided by the microactuator feedforward signal unit 26 based on the $j^{th}$ entry of the microactuator feedforward look-up table 27 is assumed to be the same as the value of the microactuator feedforward value in the $j^{th}$ entry of the microactuator feedforward look-up table 27. Thus, in accordance with equation 2, the $j^{th}$ entry of the microactuator feedforward look-up table 27 is updated during each iteration such that the microactuator feedforward control signal $u_{mff}$ that is provided based on the corresponding microactuator feedforward value is updated as specified by equation 2.

Therefore, in accordance with the iterative algorithm specified by the learning law of equation 2, the servo controller 10 may tune the microactuator feedforward values in the microactuator feedforward look-up table 27 based on a position error signal that is determined during seek operations. By tuning the microactuator feedforward values based on the position error signal, it is possible to correct for a position error that results during seek operations and, thus, it is possible to improve the control of the microactuator 5.

The value of the adaptation gain $\beta_{ff}$ in equation 2 is ideally set to be equal to $1/k_m$ when there are no disturbances and noises affecting the disk drive 1. Larger values of $\beta_{ff}$ may lead to oscillation of the microactuator feedforward values during learning in accordance with the iterative algorithm. In real situations, when the disk drive 1 is subject to disturbances and noises, a very small adaptation gain $\beta_{ff}$ may be used so that the microactuator feedforward values in the microactuator feedforward look-up table 27 will gradually learn to compensate for repeatable position error through an averaging process. The value of the adaptation gain $\beta_{ff}$ may be fixed during a design process and may be based on an observed performance of similar disk drives.

An example of tuning a microactuator feedforward value during an iteration of the iterative algorithm specified by equation 2 will now be discussed. In the example, the adaptation gain $\beta_{ff}$ is set to $1/k_m$, and it is assumed that after applying the microactuator feedforward control signal $u_{mff}(1,1)$ based on the microactuator feedforward value in the first entry of the microactuator feedforward look-up table 27, that the resulting position error is $e(1,2)$. Thus, after the first iteration, the microactuator feedforward value in the first entry of the microactuator feedforward look-up table 27 will be tuned such that the value of the microactuator feedforward control signal $u_{mff}(2,1)$ for the second iteration based on the microactuator feedforward value in the first entry of the microactuator feedforward look-up table 27, is specified by the equation:

$$u_{mff}(2,1)=u_{mff}(1,1)+u_{mfb}(1,1)+e(1,2)/k_m \quad \text{(Equation 3)}$$

In various embodiments, the servo controller 10 is configured to tune the values in the microactuator feedforward look-up table 27 after each short seek operation with a dual stage seek trajectory. Also, in various embodiments, the servo controller 10 may be configured to perform seek operations and to tune the values in the microactuator feedforward look-up table 27 when the disk drive 1 is powered-on. Furthermore, in various embodiments, the servo controller 10 may be configured to perform seek operations and to tune the values in the microactuator feedforward look-up table 27 when the disk drive 1 performs a self-test operation in which the disk drive 1 performs functions, for example, to check whether the disk drive 1 is operating properly. When the servo controller 10 tunes the microactuator feedforward values in accordance with the iterative algorithm of equation 2, it is preferable that the servo controller 10 performs at least a total number of iterations that is equal to the total number of entries in the microactuator feedforward look-up table 27, so that the table is fully tuned.

In various embodiments, the servo controller 10 tunes the microactuator feedforward values while keeping the coarse actuator feedforward values constant. The coarse actuator feedforward values may be kept constant in some embodiments, because the coarse actuator 4 likely has a much lower bandwidth than the microactuator 5 and the response of the coarse actuator 4 likely lags behind the response of the microactuator 5. As the microactuator feedforward values in the microactuator feedforward look-up table 27 are tuned iteratively and progressively, the output of the microactuator 5 during short seek operations with dual stage seek trajectories will more accurately follow the trajectory of the coarse actuator 4 in the opposite direction to reduce the total position error.

Also, in various embodiments, the microactuator feedforward control loop may run at double the rate of the measured position error signal so that the microactuator feedforward signal unit 26 updates the value of the microactuator feedforward control signal twice based on two consecutive microactuator feedforward values for each time that the head 3 reads servo data from the disk 2 to provide the sensed position signal that is used to determine the position error signal. In some embodiments, the servo controller 10 is configured to use linear extrapolation to estimate every other sample of the position error signal that is used in the iterative algorithm equation to tune the microactuator feedforward values.

Figure 4:
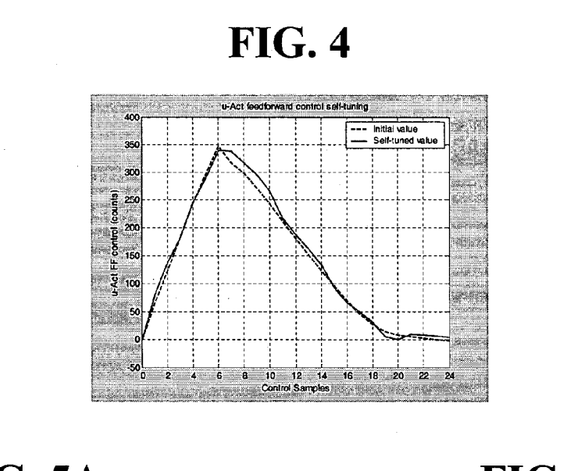
FIG. 4 is a graph that shows an example of a difference between initial values and tuned values of microactuator feedforward values.

FIG. 4 is a graph that shows experimental results of microactuator feedforward values both before and after tuning. Thus, the graph of FIG. 4 provides an example for comparing initial values of microactuator feedforward values with tuned values of the microactuator feedforward values. In FIG. 4, the horizontal axis represents a number of control samples of the microactuator feedforward values, which specifies an entry number for each microactuator feedforward value in the microactuator feedforward look-up table 27. In the example of FIG. 4, there are twenty-four entries in the microactuator feedforward look-up table 27. The vertical axis of the graph represents values of the microactuator feedforward values. The dotted curve in the graph of FIG. 4 shows initial values of the microactuator feedforward values, and the solid curve shows the microactuator feedforward values after tuning. As seen from the two curves, the tuned values may be different from the initial values.

Figure 5A:
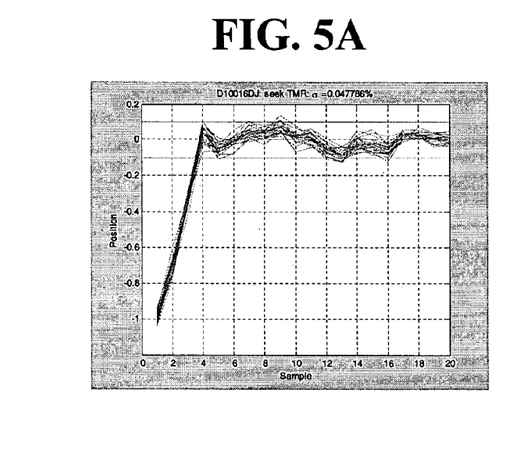
FIG. 5A is a graph that shows an example of seek TMR during short seek operations when microactuator feedforward values have not been tuned.
Figure 5B:
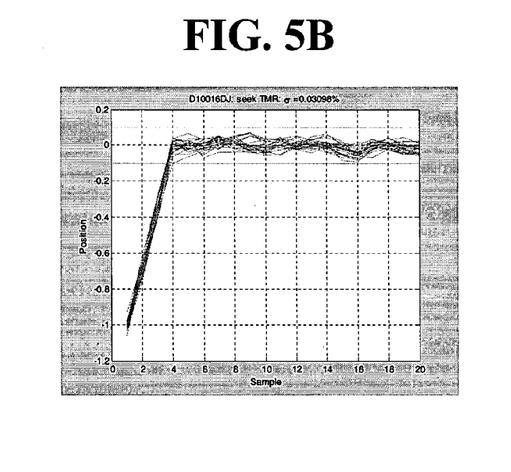
FIG. 5B is a graph that shows an example of seek TMR during short seek operations when microactuator feedforward values have been tuned.

FIG. 5A illustrates a graph of experimental results of seek operations performed across one track before tuning microactuator feedforward values. FIG. 5B illustrates a graph of experimental results of a seek operations performed across one track after tuning microactuator feedforward values. The horizontal axis of the graphs in FIGS. 5A and 5B shows a number of servo samples read by a head during each of the seek operations. The vertical axis of the graphs in FIGS. 5A and 5B shows a position of the head with respect to a target track of the seek operations. The seek operations that were performed to obtain the experimental results were performed as short seek operations with dual stage seek trajectories.

As seen in FIGS. 5A and 5B, in both cases the head is moved from a starting track (position=−1) to a target track (position=0) that is one track away, within three servo samples (from sample 1 to sample 4). However, as can be seen by comparing the graph of FIG. 5A with the graph of FIG. 5B, the head has much less seek settle TMR when the microactuator feedforward values have been tuned, since the position of the head during the seek operations varies less from the center of the target track that is represented by a position of 0 in the graphs.

Therefore, embodiments of the present invention allow for the servo controller 10 to be configured to tune the microactuator feedforward values in the microactuator feedforward look-up table 27 to compensate for position errors due to, for example, modeling errors, pivot friction of the coarse actuator 4, and hysteresis and nonlinearity characteristics of a gain of the microactuator 5. As a result, the control of movements of the microactuator 5 can be improved, and a seek TMR for short seek operations can be reduced. By reducing seek TMR, on-track can be declared sooner, a seek time can be reduced, and the performance of the disk drive 1 can be improved by increasing a data transfer rate of the disk drive 1.

While tuning the microactuator feedforward values allows for compensating for some position error, another technique that allows for further compensation of position error is adjusting the microactuator feedforward gain by which the microactuator feedforward gain adjustment unit 22 scales the microactuator feedforward control signal. Adjusting the microactuator feedforward gain allows for correcting for position error due to, for example, a change in a gain of the microactuator 5 due to a change in temperature.

In various embodiments, the servo controller 10 may be configured to adjust the microactuator feedforward gain in accordance with a microactuator feedforward gain adaptation algorithm. In some embodiments, the servo controller 10 is configured to perform a seek operation, to determine a position error signal during the seek operation, and to adjust the microactuator feedforward gain based on the determined position error signal. In various embodiments, the servo controller 10 is configured to perform multiple seek operations, to determine a position error signal during each of the seek operations, and to adjust the microactuator feedforward gain in accordance with an iterative algorithm based on the determined position error signal.

An iterative algorithm for adjusting the microactuator feedforward gain may be specified by an adaptation equation. For example, the servo controller 10 may be configured to adjust the microactuator feedforward gain in accordance with the following adaptation equation:

$$k_{ffa}(n+1) = k_{ffa}(n) + \beta_{ffa} * e(n,m) \quad \text{(Equation 4)}$$

In equation 4, n is an index that specifies a number of an iteration step of the iterative algorithm, and $\beta_{ffa}$ is an adaptation gain, similar to $\beta_{ff}$ described above, that is a parameter that can be set to a desired value. The servo controller 10 may be configured to increment the iteration step, for example, each time a seek operation is performed.

The position error signal e is comprised of a plurality of position error signal sample values that are determined each time the head 3 reads data from a servo sector, and the value m in equation 4 specifies an index of a position error signal sample value that is used for the iterative algorithm. For example, m can be set equal to two, so that the second position error signal sample value obtained during each seek operation would be used in the iterative algorithm. In equation 4, e(n,m) is a value of an $m^{th}$ sample value of the position error signal during the $n^{th}$ iteration of the iteration algorithm. In various embodiments, the servo controller 10 may be configured to calculate an average of the first few position error signal sample values during each seek operation, and to use the average of the sample values in the adaptation equation rather than the single sample value e(n,m).

In equation 4, $k_{ffa}(n)$ is a value of the microactuator feedforward gain during an $n^{th}$ iteration of the iteration algorithm, by which the microactuator feedforward gain adjustment unit 22 scales the microactuator feedforward control signal. Thus, in accordance with equation 4, the microactuator feedforward gain may be adjusted by an iterative algorithm based on the position error signal.

While the microactuator feedforward gain has been described with respect to a microactuator feedforward control loop for controlling the microactuator 5 during short seek operations, the servo controller 10 may also be configured to use the adjusted microactuator feedforward gain for a track-following control loop to improve the performance and robustness of track following operations.

In various embodiments, the servo controller 10 may be configured to adjust the microactuator feedforward gain after both short seek operations and long seek operations. During short seek operations with dual stage seek trajectories, the servo controller 10 may be configured to determine a position error signal while the microactuator 5 is moving the head 3 toward the target track during the stepping stage. Then, the servo controller 10 may be configured to use at least one sample value of the position error signal to adjust the microactuator feedforward gain in accordance with an iterative algorithm.

In various embodiments, the servo controller 10 may also adjust the microactuator feedforward gain during long seek operations. The microactuator 5 is usually turned off during long seek operations in which the coarse actuator 4 seeks the head 3 over more tracks than allowed for by the range of movement of the microactuator 5. However, embodiments of the present invention allow for the microactuator 5 to be controlled during long seek operations so that the servo controller 10 may determine the position error signal during the movement of the microactuator 5.

It should be recognized that the coarse actuator 4 may comprise, for example, a VCM that is an inertial system and does not move immediately when provided with a control signal. Embodiments of the present invention take advantage of the time during which the coarse actuator 4 has received a coarse actuator control signal, but has not started moving to move the microactuator 5 and obtain the position error signal during the movement of the microactuator 5. In various embodiments, the servo controller 10 is configured to perform a long seek operation, and is configured to move the microactuator 5 at the beginning of the long seek operation before the coarse actuator 4 moves, to pretend as if it is performing a short seek operation, and to obtain the position error signal while moving the microactuator 5.

Since, in various embodiments, the microactuator 5 can respond quickly to a control signal while the coarse actuator 4 responds slowly, the microactuator 5 can be moved quickly at the beginning of a long seek operation before the coarse actuator 4 starts moving, and then the microactuator 5 can be reset to a default position once the coarse actuator 4 starts moving. By using one of the first few samples of the position error signal for the gain adjustment, such as the second sample value when the microactuator 5 moves the head 3 at the beginning of a long seek operation, the sample value of the position error signal can reflect a position error of the head 3 due to a movement of the microactuator 5, because the coarse actuator 4 will not yet have started to move due to some inertia. By calibrating the microactuator feedforward gain during both short seek and long seek operations, the microactuator feedforward gain can be adjusted as long as there are seek operations being performed.

Therefore, embodiments of the present invention allow for the servo controller 10 to be configured to adjust the microactuator feedforward gain by which the microactuator feedforward gain adjustment unit 22 scales the microactuator feedforward control signal, so as to compensate for position errors due to, for example, a change in a gain of the microactuator 5 due to a change in temperature. As a result, the control of movements of the microactuator 5 can be improved, and a seek TMR for short seek operations can be reduced. By reducing seek TMR, on-track can be declared sooner, a seek time can be reduced, and the performance of the disk drive 1 can be improved by increasing a data transfer rate of the disk drive 1.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A disk drive, comprising:
    a disk for storing data;
    a head;
    a microactuator for positioning the head relative to the disk;
    a coarse actuator for positioning the microactuator relative to the disk; and
    a servo controller for controlling the microactuator based on a plurality of microactuator feedforward values and for tuning at least one microactuator feedforward value of the plurality of microactuator feedforward values;
    wherein the servo controller is configured to tune the at least one microactuator feedforward value so as to compensate for position error due to at least one of a nonlinearity of a gain of the microactuator, a change in the gain of the microactuator due to a change in temperature, a modeling error in a model used to generate initial values for the plurality of microactuator feedforward values, and pivot friction generated when the coarse actuator pivots an actuator arm assembly on which the head is mounted; and
    wherein the plurality of microactuator feedforward values are stored in a look-up table in a memory.

2. The disk drive of claim 1,
    wherein the servo controller is configured to tune the at least one microactuator feedforward value so as to update a stored value of the at least one microactuator feedforward value.

3. The disk drive of claim 1,
    wherein the servo controller is configured to generate initial values for the plurality of microactuator feedforward values based on a model in which a particular gain of the microactuator is modeled as a linear gain.

4. The disk drive of claim 1,
    wherein the servo controller is configured to control the coarse actuator and the microactuator to perform seek operations;
    wherein the servo controller is configured to determine a position error signal during each of the seek operations; and
    wherein the servo controller is configured to tune the at least one microactuator feedforward value in accordance with an iterative algorithm based on the position error signal.

5. The disk drive of claim 4,
    wherein the iterative algorithm is specified by the equation:

$$u_{mff}(n+1,j)=u_{mff}(n,j)+u_{mfb}(n,j)+\beta_{ff}*e(n,j+1), j=1,\ldots,L;$$

wherein n is a variable that specifies a number of iteration steps of the iterative algorithm that have been performed;

wherein j is a variable that specifies an index number for identifying a microactuator feedforward value from among the plurality of microactuator feedforward values;

wherein L is the total number of microactuator feedforward values of the plurality of microactuator feedforward values;

wherein $\beta_{\mathit{ff}}$ is a variable that specifies an adaptation gain;

wherein $u_{\mathit{mff}}$ is a microactuator feedforward control signal that is provided by the servo controller based on the plurality of microactuator feedforward values;

wherein $u_{\mathit{mfb}}$ is a microactuator compensation signal; and wherein e is the position error signal.

6. The disk drive of claim 1, wherein the coarse actuator is configured to coarsely position the head; and wherein the microactuator is configured to finely position the head.

7. The disk drive of claim 1, wherein the coarse actuator comprises a voice coil motor; and wherein the microactuator comprises at least one of a piezoelectric actuator, an electromagnetic actuator, and an electrostatic actuator.

8. The disk drive of claim 1, wherein the servo controller is configured to provide dual-loop feedforward control in which the coarse actuator is controlled in accordance with a coarse actuator control loop and the microactuator is controlled in accordance with a microactuator control loop;

wherein the servo controller is configured to provide feedforward control to the coarse actuator control loop based on a plurality of coarse actuator feedforward values;

wherein the servo controller is configured to provide feedforward control to the microactuator control loop based on the plurality of microactuator feedforward values; and wherein the servo controller is configured to use a single reference trajectory signal for both the coarse actuator control loop and the microactuator control loop.

9. The disk drive of claim 1, wherein the servo controller is configured to control the coarse actuator based on a plurality of coarse actuator feedforward values and to control the microactuator based on the plurality of microactuator feedforward values to perform a short seek operation with a dual-stage seek trajectory, including a stepping stage and a retracting stage, to position the head over a target track;

wherein the servo controller is configured to control the microactuator during the stepping stage such that the microactuator moves the head toward the target track; and wherein the servo controller is configured to control the coarse actuator and the microactuator during the retracting stage such that the coarse actuator moves the microactuator toward the target track while the microactuator moves the head so as to maintain the head over the target track.

10. A disk drive, comprising:

a disk having a surface provided with a plurality of tracks for storing data;

a head;

a microactuator for positioning the head relative to the disk;

a coarse actuator for positioning the microactuator relative to the disk; and a servo controller for providing a microactuator feedforward control signal based on a plurality of microactuator feedforward values, and for providing a microactuator compensation signal, and for controlling the microactuator based on a combination of the microactuator feedforward control signal and the microactuator compensation signal;

wherein the servo controller is configured to determine a position error signal during a seek operation; and wherein the servo controller is configured to tune at least one microactuator feedforward value of the plurality of microactuator feedforward values based on the position error signal.

11. The disk drive of claim 10, wherein the servo controller is configured to tune the at least one microactuator feedforward value based on the position error signal such that a seek track-misregistration of a subsequent seek operation is less than a seek track-misregistration of the seek operation.

12. The disk drive of claim 10, wherein the servo controller is configured to control the coarse actuator and the microactuator to perform the seek operation and to tune the at least one microactuator feedforward value when the disk drive is powered-on.

13. The disk drive of claim 10, wherein the servo controller is configured to control the coarse actuator and the microactuator to perform the seek operation and to tune the at least one microactuator feedforward value when the disk drive performs a self-test.

14. The disk drive of claim 10, wherein the servo controller is configured to determine the position error signal during the positioning of the head based on a difference between an actual position of the head during the positioning of the head and a reference trajectory of the head during the positioning of the head; and wherein the servo controller is configured to determine the actual position of the head during the positioning of the head based on servo data that is read from servo sectors on the disk during the positioning of the head.

15. A method for providing control in a disk drive, the disk drive having a disk, a head for reading data from the disk, a microactuator for positioning the head relative to the disk, and a coarse actuator for positioning the microactuator relative to the disk, the method comprising:

controlling the microactuator based on a plurality of microactuator feedforward values that are stored in a look-up table in a memory; and tuning at least one microactuator feedforward value of the plurality of microactuator feedforward values;

wherein the step of tuning at least one microactuator feedforward value, comprises:

tuning at least one microactuator feedforward value of the plurality of microactuator feedforward values so as to compensate for position error due to at least one of a nonlinearity of a gain of the microactuator, a change in the gain of the microactuator due to a change in temperature, a modeling error in a model used to generate initial values for the plurality of microactuator feedforward values, and pivot friction generated when the coarse actuator pivots an actuator arm assembly on which the head is mounted.

16. The method of claim 15, wherein the step of tuning at least one microactuator feedforward value of the plurality of microactuator feedforward values so as to compensate for position error, comprises:
tuning at least one microactuator feedforward value of the plurality of microactuator feedforward values so as to update a stored value of the at least one microactuator feedforward value.

17. The method of claim 15, further comprising:
generating initial values for the plurality of microactuator feedforward values based on a model in which a particular gain of the microactuator is modeled as a linear gain.

18. The method of claim 15, further comprising:
controlling the coarse actuator based on a plurality of coarse actuator feedforward values.

19. The method of claim 15,
wherein the step of controlling the microactuator, comprises:
controlling the microactuator based on the plurality of microactuator feedforward values to perform seek operations; and
determining a position error signal during each of the seek operations; and
wherein the step of tuning at least one microactuator feedforward value of the plurality of microactuator feedforward values so as to compensate for position error, comprises:
tuning at least one microactuator feedforward value of the plurality of microactuator feedforward values in accordance with an iterative algorithm based on the position error signal.

20. The method of claim 19,
wherein the iterative algorithm is specified by the equation:

$$u_{mff}(n+1,j)=u_{mff}(n,j)+u_{mfb}(n,j)+\beta_{ff}*e(n,j+1), j=1,\ldots,L;$$

wherein n is a variable that specifies a number of iteration steps of the iterative algorithm that have been performed;
wherein j is a variable that specifies an index number for identifying a microactuator feedforward value from among the plurality of microactuator feedforward values;
wherein L is the total number of microactuator feedforward values of the plurality of microactuator feedforward values;
wherein $\beta_{ff}$ is a variable that specifies an adaptation gain;
wherein $u_{mff}$ is a microactuator feedforward control signal that is provided based on the plurality of microactuator feedforward values;
wherein $u_{mfb}$ is a microactuator compensation signal; and
wherein e is the position error signal.

21. The method of claim 15,
wherein the coarse actuator comprises a voice coil motor; and
wherein the microactuator comprises at least one of a piezoelectric actuator, an electromagnetic actuator, and an electrostatic actuator.

22. A method for providing control in a disk drive, the disk drive having a disk, a head for reading data from the disk, a microactuator for positioning the head relative to the disk, and a coarse actuator for positioning the microactuator relative to the disk, the method comprising:
providing a microactuator feedforward control signal based on a plurality of microactuator feedforward values;
providing a microactuator compensation signal;
controlling the microactuator based on a combination of the microactuator feedforward control signal and the microactuator compensation signal to perform a seek operation;
determining a position error signal during the seek operation; and
tuning at least one microactuator feedforward value of the plurality of microactuator feedforward values based on the position error signal.

23. The method of claim 22, wherein the step of tuning at least one microactuator feedforward value, comprises:
tuning at least one microactuator feedforward value of the plurality of microactuator feedforward values based on the determined position error signal such that a seek track-misregistration of a subsequent seek operation is less than a seek track-misregistration of the performed seek operation.

24. The method of claim 22,
wherein the steps of controlling the microactuator, determining a position error signal, and tuning at least one microactuator feedforward value, are performed when the disk drive is powered-on.

25. The method of claim 22,
wherein the steps of controlling the microactuator, determining a position error signal, and tuning at least one microactuator feedforward value, are performed when the disk drive performs a self-test.

26. A disk drive, comprising:
a disk for storing data;
a head;
a microactuator for positioning the head relative to the disk;
a coarse actuator for positioning the microactuator relative to the disk; and
a servo controller for performing a seek operation by controlling the coarse actuator and the microactuator, and for determining a position error signal during the seek operation;
wherein the servo controller is configured to scale a microactuator feedforward control signal in accordance with a microactuator feedforward gain, and to control the microactuator based on the scaled microactuator feedforward control signal;
wherein the microactuator feedforward control signal is a different signal than the position error signal; and
wherein the servo controller is configured to adjust the microactuator feedforward gain based on the position error signal.

27. The disk drive of claim 26,
wherein the servo controller is configured to adjust the microactuator feedforward gain to compensate for position error caused by a change in a gain of the microactuator due to a change in temperature.

28. The disk drive of claim 26,
wherein the servo controller is configured to provide the microactuator feedforward control signal based on a microactuator feedforward value of a plurality of microactuator feedforward values that are stored in a look-up table in a memory.

29. The disk drive of claim 26,
wherein the servo controller is configured to perform multiple seek operations and to determine the position error signal during each of the multiple seek operations; and
wherein the servo controller is configured to adjust the microactuator feedforward gain in accordance with an iterative algorithm based on the position error signal.

30. The disk drive of claim 29,
wherein the iterative algorithm is specified by the equation:

$$k_{ffa}(n+1)=k_{ffa}(n)+\beta_{ffa}*e(n,m);$$

wherein n is a variable that specifies a number of iteration steps of the iterative algorithm that have been performed;
wherein $\beta_{ffa}$ is a variable that specifies an adaptation gain;
wherein $k_{ffa}$ is the microactuator feedforward gain;
wherein e is the position error signal that comprises a plurality of position error signal sample values; and
wherein m is an index for specifying a specific position error signal sample value of the plurality of position error signal sample values.

31. The disk drive of claim 26,
wherein the servo controller is configured to perform the seek operation as a short seek operation in which the servo controller controls the coarse actuator and the microactuator in accordance with a dual-stage seek trajectory, including a stepping stage and a retracting stage, to position the head over a target track;
wherein the servo controller is configured to control the microactuator during the stepping stage such that the microactuator moves the head toward the target track; and
wherein the servo controller is configured to control the coarse actuator and the microactuator during the retracting stage such that the coarse actuator moves the microactuator toward the target track while the microactuator moves the head so as to maintain the head over the target track.

32. The disk drive of claim 26,
wherein the servo controller is configured to perform the seek operation as a long seek operation in which the servo controller controls the coarse actuator to move the head toward a target track; and
wherein the servo controller is configured to control, at the beginning of the long seek operation before the coarse actuator moves, the microactuator to move the head based on the scaled microactuator feedforward control signal, and to determine the position error signal when the microactuator moves the head.

33. The disk drive of claim 26,
wherein the position error signal comprises a plurality of position error signal sample values; and
wherein the servo controller is configured to adjust the microactuator feedforward gain based on one of the plurality of position error signal sample values.

34. The disk drive of claim 26,
wherein the coarse actuator comprises a voice coil motor; and
wherein the microactuator comprises at least one of a piezoelectric actuator, an electromagnetic actuator, and an electrostatic actuator.

35. The disk drive of claim 26,
wherein the servo controller is configured to control the coarse actuator based on a plurality of coarse actuator feedforward values.

36. A method for providing control in a disk drive, the disk drive having a disk, a head for reading data from the disk, a microactuator for positioning the head relative to the disk, and a coarse actuator for positioning the microactuator relative to the disk, the method comprising:
scaling a microactuator feedforward control signal in accordance with a microactuator feedforward gain;
controlling the microactuator based on the scaled microactuator feedforward control signal during a seek operation;
determining a position error signal during the seek operation; and
adjusting the microactuator feedforward gain based on the position error signal;
wherein the microactuator feedforward control signal is a different signal than the position error signal.

37. The method of claim 36, wherein the step of adjusting the microactuator feedforward gain, comprises:
adjusting the microactuator feedforward gain based on the position error signal to compensate for position error caused by a change in a gain of the microactuator due to a change in temperature.

38. The method of claim 36,
wherein the step of controlling the microactuator, comprises:
controlling the microactuator based on the scaled microactuator feedforward control signal during multiple seek operations;
wherein the step of determining a position error signal, comprises:
determining a position error signal during each of the seek operations; and
wherein the step of adjusting the microactuator feedforward gain, comprises:
adjusting the microactuator feedforward gain in accordance with an iterative algorithm based on the position error signal.

39. The method of claim 38,
wherein the iterative algorithm is specified by the equation:

$$k_{ffa}(n+1)=k_{ffa}(n)+\beta_{ffa}*e(n,m);$$

wherein n is a variable that specifies a number of iteration steps of the iterative algorithm that have been performed;
wherein $\beta_{ffa}$ is a variable that specifies an adaptation gain;
wherein $k_{ffa}$ is the microactuator feedforward gain;
wherein e is the position error signal that comprises a plurality of position error signal sample values; and
wherein m is an index for specifying a specific position error signal sample value of the plurality of position error signal sample values.

40. The method of claim 36,
wherein the step of controlling the microactuator, comprises:
controlling the microactuator based on the scaled microactuator feedforward control signal during a short seek operation with a dual-stage seek trajectory, including a stepping stage and a retracting stage, such that during the stepping stage the microactuator moves the head toward a target track on the disk and during the retracting stage the microactuator moves to maintain the head over the target track while the coarse actuator moves the microactuator toward the target track.

41. The method of claim 36, further comprising:

controlling the coarse actuator to move the microactuator toward a target track on the disk during a long seek operation;

wherein the step of controlling the microactuator, comprises:

controlling, at the beginning of the long seek operation before the coarse actuator moves, the microactuator based on the scaled microactuator feedforward control signal to move the head; and wherein the step of determining the position error signal, comprises:

determining the position error signal during the long seek operation when the microactuator moves the head.

42. The method of claim 36, wherein the step of determining the position error signal, comprises:

determining the position error signal that comprises a plurality of position error signal sample values during the seek operation; and wherein the step of adjusting the microactuator feedforward gain, comprises:

adjusting the microactuator feedforward gain based on one of the plurality of position error signal sample values.

43. The method of claim 36, further comprising:

controlling the coarse actuator based on a plurality of coarse actuator feedforward values.

44. The method of claim 36, wherein the coarse actuator comprises a voice coil motor; and wherein the microactuator comprises at least one of a piezoelectric actuator, an electromagnetic actuator, and an electrostatic actuator.

45. The method of claim 36, wherein the step of scaling the microactuator feedforward control signal, comprises:

providing the microactuator feedforward control signal based on a microactuator feedforward value; and scaling the microactuator feedforward control signal in accordance with the microactuator feed forward gain.

* * * * *